United States Patent
Zhu et al.

(10) Patent No.: US 9,475,612 B2
(45) Date of Patent: Oct. 25, 2016

(54) INDICATOR CIRCUIT FOR STORAGE CONTAINER FOR ADDRESSABLE OBJECTS

(71) Applicants: Shengbo Zhu, San Jose, CA (US); Su Shiong Huang, Bellevue, WA (US)

(72) Inventors: Shengbo Zhu, San Jose, CA (US); Su Shiong Huang, Bellevue, WA (US)

(73) Assignee: MICRODATA CORPORATION, San Jose, CA (US)

( * ) Notice: Subject to any disclaimer, the term of this patent is extended or adjusted under 35 U.S.C. 154(b) by 194 days.

(21) Appl. No.: 14/121,572

(22) Filed: Sep. 19, 2014

(65) Prior Publication Data

US 2016/0083139 A1     Mar. 24, 2016

(51) Int. Cl.
| | |
|---|---|
| *G08B 13/14* | (2006.01) |
| *B65D 25/20* | (2006.01) |
| *G05B 19/042* | (2006.01) |
| *G06Q 10/08* | (2012.01) |
| *B42F 15/00* | (2006.01) |

(52) U.S. Cl.
CPC ......... *B65D 25/205* (2013.01); *B42F 15/0035* (2013.01); *B42F 15/0094* (2013.01); *G05B 19/0423* (2013.01); *G06Q 10/0875* (2013.01)

(58) Field of Classification Search
CPC ..... G08B 13/14; B65D 25/205; B42F 15/00; B42F 21/06; B42F 15/0002; B42F 15/0094; B42F 21/065
USPC ................. 340/570, 691.1, 691.6, 8.1, 815.4
See application file for complete search history.

(56) References Cited

U.S. PATENT DOCUMENTS

| | | | | |
|---|---|---|---|---|
| 5,977,875 A | * | 11/1999 | Lin ...................... | G06K 17/00 340/568.2 |
| 6,664,895 B2 | * | 12/2003 | Zhu ..................... | G06K 17/00 340/570 |
| 7,079,044 B1 | * | 7/2006 | Stanfield ............ | G06F 17/30011 340/539.13 |
| 8,471,717 B2 | * | 6/2013 | Zhu ..................... | G06Q 10/00 340/540 |
| 8,525,674 B2 | * | 9/2013 | Zhu ..................... | E05B 17/10 340/540 |
| 8,717,143 B2 | * | 5/2014 | Zhu ..................... | B42F 13/40 211/119.003 |
| 8,963,716 B2 | * | 2/2015 | Zhu ..................... | B42F 15/0082 340/540 |

* cited by examiner

*Primary Examiner* — Toan N Pham

(57) ABSTRACT

An indicator circuit for a storage container designed to enable remote electronic searching for file folders located within the container. Address signals from a host computer are supplied to the storage container to designate a sought file folder. The indicator circuit is activated whenever a sought file folder is located in a given container. When two or more storage containers are interconnected to receive address signals designating a sought file folder, only the indicator circuit of the storage container containing the sought file folder is activated.

12 Claims, 3 Drawing Sheets

INDICATOR CIRCUIT FOR STORAGE CONTAINER FOR ADDRESSABLE OBJECTS

BACKGROUND OF THE INVENTION

This invention relates in general to storage containers designed to enable remote electronic searching for objects located within the containers. More particularly, this invention relates to an indicator circuit for such storage containers which is activated whenever a sought object is located in a given container.

Some known storage containers are constructed according to a unique design for enabling remote electronic searching for objects, such as file folders and documents within such file folders, located somewhere within a collection of electrically interconnected storage containers. Commonly assigned pending U.S. patent application Ser. No. 13/694, 829 filed Jan. 8, 2013 for "Storage Container For Electronically Addressable File Folders And Documents", now U.S. Pat. No. 8,963,716 issued Feb. 24, 2015, the disclosure of which is hereby incorporated by reference, discloses such a container design. With reference to FIG. 1, each container 10 is provided with a pair of electrically conductive support rails 17, 18 mounted in the container 10 interior near the top margin. The rails 17, 18 are laterally spaced by an amount designed to receive the ends of support braces 21, 22 incorporated into file folders 20 (only one illustrated in FIG. 1 for clarity) removably placed within the container 10 to provide both mechanical support for each file folder 20 and electrical connections to circuitry including an address decoder located within one of the file folder 20 support braces 21, 22 (as illustrated, support brace 21). The circuitry in support brace 21 also includes a pair of visible indicators: a POWER ON indicator 23, and an ADDRESS MATCH indicator 24 (each preferably an LED). The circuitry in support brace 21 is described and illustrated in commonly-assigned, co-pending U.S. patent application Ser. No. 12/803,712 filed Jul. 2, 2010 for "Documents Management Using Remote Document Location And Retrieval ", now U.S. Pat. No. 8,994,534 issued Mar. 31, 2015, the disclosure of which is hereby incorporated by reference.

A container circuit board (not illustrated in FIG. 1) is mounted in the container 10 and contains electronic circuitry for receiving unique address signals supplied by a host computer via a local controller which identify a folder or document to be located. The rails 17, 18 are individually coupled to the electronic circuitry on the container circuit board: one of the rails (rail 17) receives the address signals from the local controller and supplies them to all file folders 20 residing in the container 10; and furnishes response signals from the file folders to the electronic circuitry of the container circuit board. These response signals are coupled to the local controller, which sends the information contained in the signals to the host computer. The information in the response signals includes the identification of the storage container in which the found folder is located. Visible POWER ON indicator 23 on file folder 20 is activated whenever the folder brace 21 is ohmically connected to rails 17, 18 in order to signify that the file folder 20 is installed correctly and is operable. Indicator 23 is preferably an LED having a relatively low current draw when activated of no more than about 0.3 mA. Visible ADDRESS MATCH indicator 24 is activated whenever the address stored in the circuitry in folder brace 21 matches the folder address supplied to the file folder circuitry by the local controller via rail 17. Indicator 24 is preferably an LED having a substantially larger current draw of about 15.0 mA when activated Each container 10 also has a visible indicator 25 mounted on a wall (such as wall 12) in a position visible to a human operator standing within viewing distance of the storage container 10. Indicator 25 is coupled to the electronic circuitry on the container circuit board and is illuminated whenever the address signals supplied by the host computer specify a file folder or document located in that container 10. An input connector 32 and an output connector 33 are mounted on one of the walls of container 10, such as wall 12: the input connector 32 receives the address signals from the host computer via the local controller; the output connector 33 couples address signals from one container 10 to another container and returns search result information from any container to the local controller. The local controller sends this information to the host computer.

FIG. 2 illustrates a stacked array of such storage containers. As seen in this Fig., a plurality of storage containers 10-1, 10-2, . . . , 10-$n$ are stacked in a vertical array. Each container 10-I has an input connector 32-1, 32-2, . . . , 32-$n$; and an output connector 33-1, 33-2, . . . , 33-$n$. A local controller 45 receives address signals from a remote host computer (not shown) and supplies these signals to one of the containers 10-1 by means of an input cable 46 and input connector 32-1 of container 10-1. The address input signals are coupled to the remaining containers in the stack by means of jumper cables 34-1, 34-2, . . . , 34-$n$-1 which are individually connected between the output connector 33-I of one container 10-I and the input connector 32-I of the next container 10-I. In a preferred embodiment, connectors 32-I, 33-I and cables 34-I and 46 are standard USB devices.

The arrangement of FIG. 2 has no provision for uniquely illuminating the visible indicator 25-I of the container 10-I in which the file folder 20 having the correct sought address is located. This does not pose a problem when only one container 10 is connected to the local controller 45. However, when a plurality of storage containers 10-I of the type described are interconnected as shown in FIG. 2 and one of the containers holds the sought file folder, the visible indicators 25-I of all of the storage containers 10-I are activated. This requires a human operator to visually inspect the interior of each storage container 10-I in the stack until the file folder having the activated ADDRESS MATCH LED 24 is located, which unduly prolongs the search process.

SUMMARY OF THE INVENTION

The invention comprises an indicator circuit for storage containers of the type described above which ensures that only the indicator of the storage container in which the sought file folder having the matching address is activated, while the rest of the container indicators in the interconnected array of storage containers remain unactivated.

In a broadest aspect, the invention comprises the improvement in a storage container having circuitry for enabling remote location and retrieval of documents located in file folders operationally installed within said storage container, the storage container including a base wall; a plurality of upstanding wall members connected to the base wall, the base wall and the plurality of upstanding wall members defining an enclosure volume; first and second electrically conductive support members each secured to at least one of the wall members in an essentially parallel and mutually spaced manner, the spacing between the first and second support members being sufficient to accommodate the ends of a file folder in mechanically supportive fashion; an electrical input connector secured to one of the upstanding wall members and ohmically coupled to the first and second support members for providing file folder address signals supplied by a source to at least one of the first and second support members, so that the file folder address signals are coupled to any file folder supported by the support members; and a storage container indicator; the improvement comprising an indicator control circuit for activating the storage container indicator when a file folder operationally installed on the first and second electrically conductive support members has an address matching the file folder address signals and the storage container is electrically coupled to another storage container.

The indicator control circuit preferably includes a fixed resistance coupled between the input connector and one of the first and second electrically conductive support members, means for sensing the voltage value at the junction of the fixed resistance and that one of the first and second electrically conductive support members, the sensing means having an input coupled to the junction and an output, and a control unit having an input coupled to the output of the sensing means and an output coupled to the storage container indicator for activating the storage container indicator when the voltage value reaches a threshold value.

The storage container indicator preferably comprises a light source, most preferably an LED, mounted to one of the wall members in a location visible from the exterior of the container.

The sensing means preferably comprises an operational amplifier and the control unit preferably comprises a microcontroller.

The storage container also includes an electrical output connector secured to one of the upstanding wall members and coupled to the input connector for manifesting the file folder search signals supplied by the source to at least one of the first and second support members, so that the file folder search signals can be coupled to support members located in another document storage container having an electrical input connector coupled to the electrical output connector.

In another aspect, the invention comprises an array of portable document storage containers for enabling remote location and retrieval of documents located in file folders received with the storage containers. The array comprises a plurality of document storage containers each having a base wall; a plurality of upstanding wall members connected to the base wall, the base wall and the plurality of upstanding wall members defining an enclosure volume; first and second electrically conductive support members each secured to at least one of the wall members in an essentially parallel and mutually spaced manner, the spacing between the first and second support members being sufficient to accommodate the ends of a file folder in mechanically supportive fashion; an electrical input connector secured to one of the upstanding wall members and ohmically coupled to the first and second support members for providing file folder address signals supplied by a source to at least one of the first and second support members, an electrical output connector secured to one of the upstanding wall members and ohmically coupled to the electrical input connector, the output connector of some (preferably all) of the document storage containers being coupled to the input connectors of other ones of the document storage containers to form an electrically intercoupled array so that the file folder address signals are coupled to any file folder supported by the support members in all of the storage containers in the intercoupled array; a storage container indicator; and an indicator control circuit for activating the storage container indicator in the storage container when a file folder operationally installed on the first and second electrically conductive support members has an address matching the file folder address signals; and a controller having an output coupled to the input connector of one of the plurality of document storage containers for providing file folder search signals supplied by a source to at least one of the first and second support members of the document storage container connected thereto, the file folder search signals being coupled to all of the document storage containers in the electrically intercoupled array so that the file folder search signals are coupled to any file folder supported by the support members in any of the document storage containers in the intercoupled array.

The indicator control circuit preferably includes a fixed resistance coupled between the input connector and one of the first and second electrically conductive support members, means for sensing the voltage value at the junction of the fixed resistance and that one of the first and second electrically conductive support members, the sensing means having an input coupled to the junction and an output, and a control unit having an input coupled to the output of the sensing means and an output coupled to the storage container indicator for activating the storage container indicator when the voltage value reaches a threshold value.

The storage container indicator preferably comprises a light source, most preferably an LED, mounted to one of the wall members in a location visible from the exterior of said container.

In the preferred embodiment, the sensing means comprises an operational amplifier and the control unit comprises a microcontroller.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
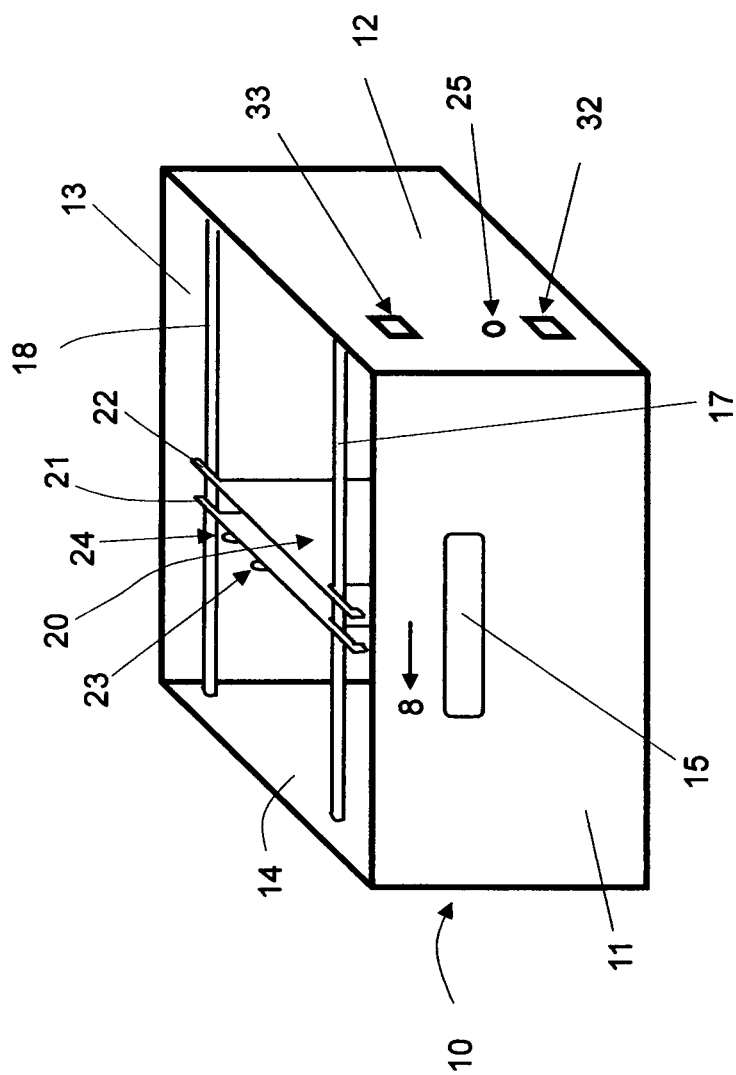
FIG. 1 is a perspective view of a preferred embodiment of a storage container incorporating the invention.
Figure 2:
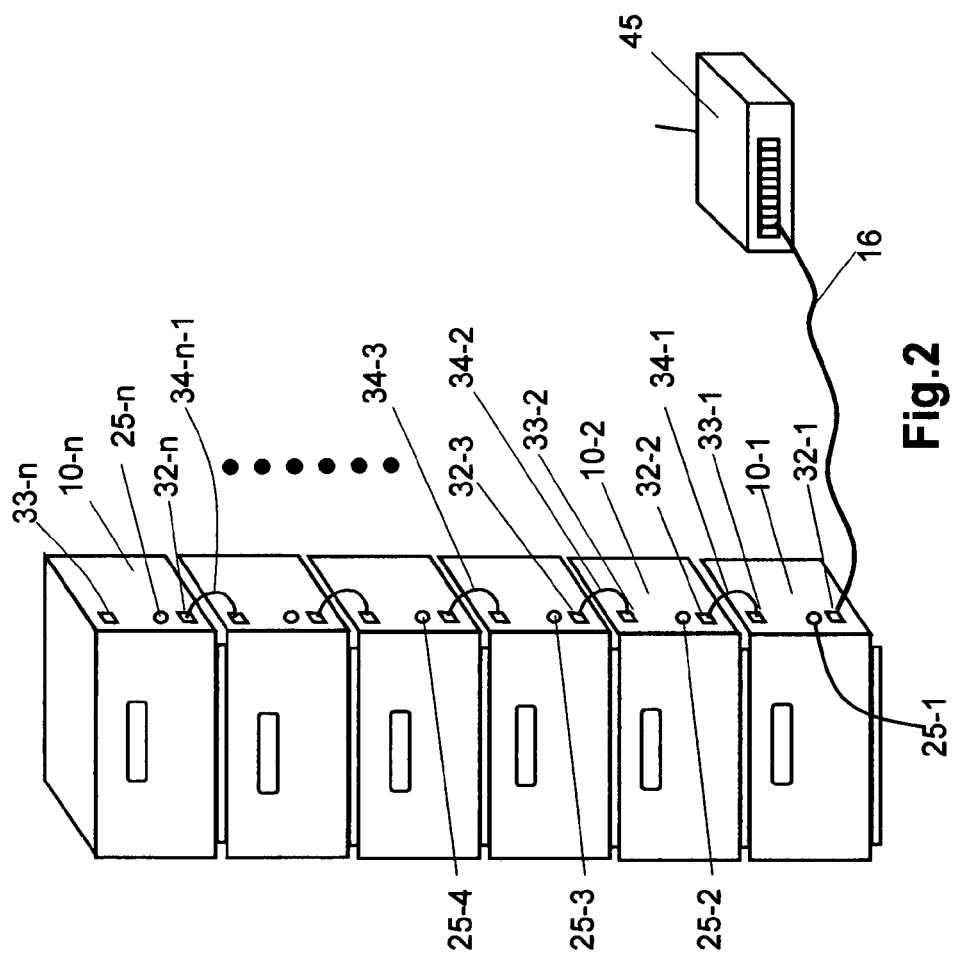
FIG. 2 is a schematic perspective view illustrating the stacked configuration of a plurality of storage containers of the type shown in FIG. 1 and a local controller, with the storage containers electrically interconnected by means of cables.

Turning now to the drawings, FIGS. 1 and 2 as described above illustrate a storage container system in which a plurality of essentially identical storage containers 10-I for file folders capable of being electronically addressed by an associated local controller are arranged in a stacked configuration and electrically interconnected by means of data and power cables. Each storage container 10-I is provided with a storage container indicator 25-I, which in the preferred embodiment is an LED with a current draw when activated of about 15.0 mA.

Figure 3:
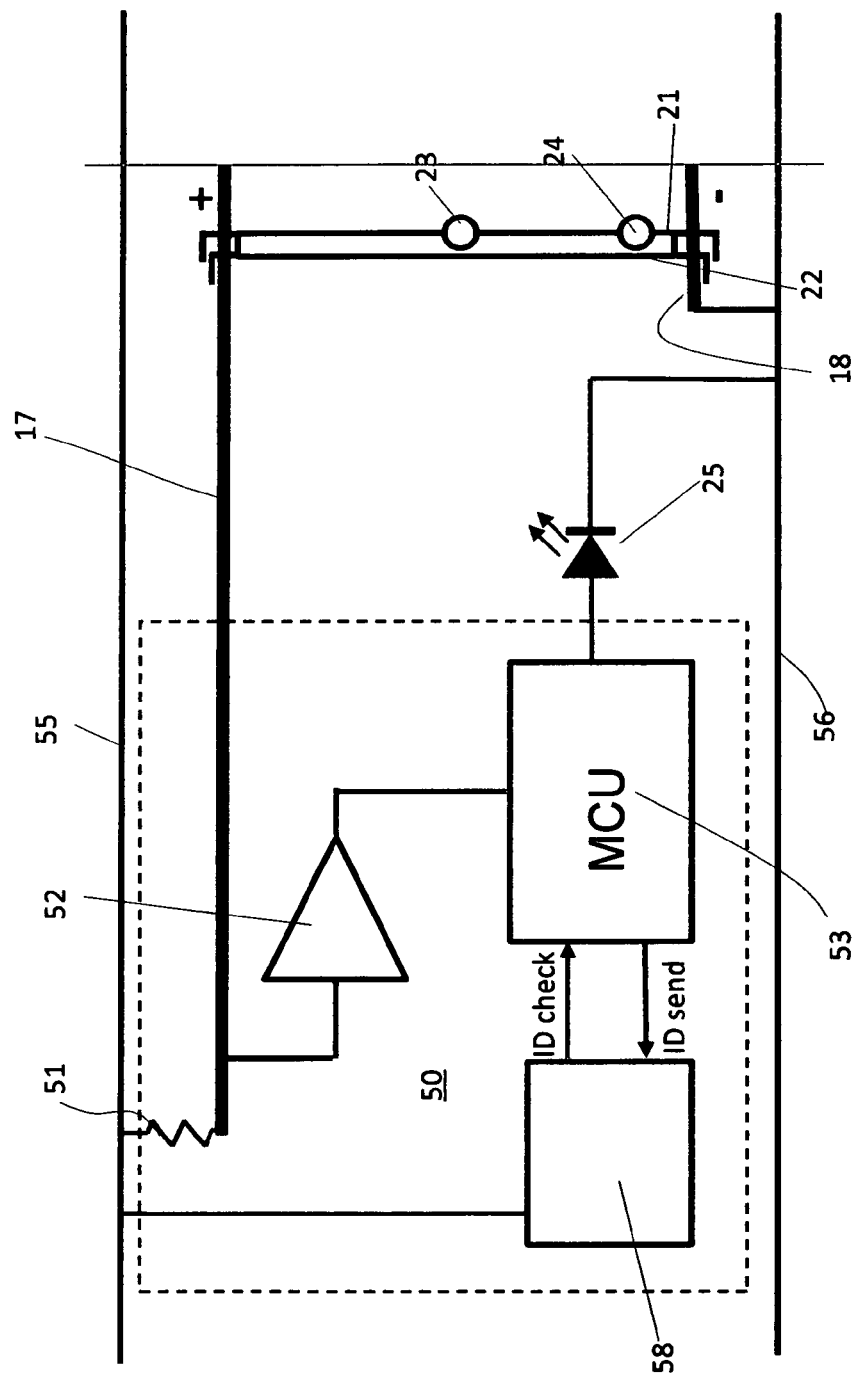
FIG. 3 is a schematic view of an indicator circuit according to the invention.

Located within each storage container 10-I is a storage container indicator activation circuit illustrated in FIG. 3. As seen in this Fig., a circuit board 50 has mounted thereon a resistor 51, an amplifier 52, a microcontroller unit (MCU) 53, and an isolator circuit 58. In the preferred embodiment, resistor 51 is a 0.5 ohm one watt resistor; amplifier 52 is a type MCP6002 operational amplifier; and MCU 53 is a type PIC 16F1823 microcontroller unit available from Microchip Technology, Inc. of Chandler, Ariz. Isolator circuit 58 is used to isolate incoming signals on positive data conductor 55 from outgoing response signals generated by MCU 53, such as the identification of the storage container in which MCU 53 is located (the ID send signal).

One terminal of resistor 51 is connected to the positive data conductor 55 of a USB bus. The other terminal of resistor 51 is coupled to the active signal input of amplifier 52 and to electrically conductive rail 17. The output of amplifier 52 is coupled to a data input of MCU 53. A control output of MCU 53 is coupled to the anode of indicator 25 of the associated storage container. The cathode terminal of indicator 25 is connected to the negative data conductor 56 of the USB bus.

In operation, an incoming address on positive data conductor 55 is coupled via resistor 51 and rail 17 to the electronic circuitry in brace 21 of all folders operationally installed in all storage containers interconnected in the manner described above with reference to FIG. 2. When the incoming address matches the address stored in the electronic circuitry in one of the braces 21, such as the brace 21 illustrated in FIG. 3, the visible ADDRESS MATCH indicator 24 on that brace 21 is activated. Activation of the visible ADDRESS MATCH indicator 24 causes substantial current to flow through resistor 51 of the storage container containing the addressed brace 21. This causes the output of amplifier 52 to change state, which signals MCU 53 to generate a signal to activate the storage container visible indicator 25. Since the incoming address is unique, no other folder brace visible indicator 24 will be activated. Consequently, only the storage container visible indicator 25 in the storage container in which the addressed folder is located will be activated. As a result, a human operator can merely look for the storage container having the activated visible indicator 25 and proceed to that storage container to retrieve the sought file folder 20.

As noted above, each file folder 20 is provided with a visible POWER ON indicator 23 which is activated whenever the associated file folder 20 is operationally installed in the storage container. In establishing the initial parameters for the storage container indicator activation circuit, the total current draw of the visible POWER ON indicators 23 for the maximum number of file folders 20 which can be accommodated by a given storage container is calculated and the resultant value is used to set the operating threshold of amplifier 52. This ensures that amplifier 52 will only signal MCU 53 to generate the activation signal for visible indicator 25 when an address match has occurred within a file folder 20 in that storage container.

As will now be apparent, storage containers incorporating the invention afford the advantage of providing a unique observable response to the presentation of a file folder address to a file folder having electronic circuitry containing that file folder address. In particular, one and only one of the storage container visible indicators 25 will be activated in response to an address match between an address presented on the data conductor 55 of the data bus and a folder address stored in the folder brace circuitry. Since only one storage container visible indicator 25 will be activated, locating the storage container housing the sought folder identified by the presented address on the bus is reduced to a simple matter of looking for the storage container with the activated visible indicator 25.

Although the above provides a full and complete disclosure of the preferred embodiments of the invention, various modifications, alternate constructions and equivalents will occur to those skilled in the art. For example, while the invention has been described and illustrated with reference to a visible indicator 25, it is equally applicable to storage container arrays having audible indicators, or a combination of both visible and audible indicators. In addition, while the invention has been described and illustrated in the context of an array of vertically stacked storage containers, it is equally applicable to an array of storage containers which are arranged horizontally or both horizontally and vertically. Moreover, the invention is also conformable to other types of storage container bus interconnection arrangements than the cable arrangement shown and described. One such alternate interconnection arrangement is shown and described in commonly-assigned, co-pending U.S. patent application Ser. No. 13/987,352 filed Jul. 16, 2013 for "Two Stage Draw Latch For Stackable Storage Box With Removable Cover", now U.S. Pat. No. 9,187,210 issued Nov. 17, 2015, the disclosure of which is hereby incorporated by reference. Therefore, the above should not be construed as limiting the invention, which is defined by the appended claims.

What is claimed is:
1. A storage container having circuitry for enabling remote location and retrieval of documents located in file folders operationally installed within said storage container, each of said file folders having opposing ends, said storage container including a base wall; a plurality of upstanding wall members connected to said base wall, said base wall and said plurality of upstanding wall members defining an enclosure volume; first and second electrically conductive support members each secured to at least one of said wall members in an essentially parallel and mutually spaced manner, the mutually spaced manner between said first and second support members being sufficient to accommodate said ends of a file folder in mechanically supportive fashion; an electrical input connector secured to one of said upstanding wall members and ohmically coupled to said first and second support members for providing file folder address signals supplied by a source to at least one of said first and second support members, so that said file folder address signals are coupled to any file folder supported by said support members; a storage container indicator; and an indicator control circuit for activating said storage container indicator when the file folder operationally installed on said first and second electrically conductive support members has an address matching said file folder address signals and said storage container is electrically coupled to another storage container, said indicator control circuit including a fixed resistance coupled between said electrical input connector and one of said first and second electrically conductive support members, means for sensing a voltage value at a junction of said fixed resistance and said one of said first and second electrically conductive support members, said sensing means having an input coupled to said junction and an output, and a control unit having an input coupled to the output of said sensing means and an output coupled to said storage container indicator for activating said storage container indicator when said voltage value reaches a threshold value.

2. The invention of claim 1, wherein said storage container indicator comprises a light source mounted to one of said wall members in a visible location.

3. The invention of claim 2 wherein said light source is an LED.

4. The invention of claim 1, wherein said sensing means comprises an operational amplifier.

5. The invention of claim 1, wherein said control unit comprises a microcontroller.

6. The invention of claim 1 further including an electrical output connector secured to one of said upstanding wall members and coupled to said electrical input connector for manifesting said file folder search signals supplied by a source to at least one of said first and second support members, so that said file folder search signals are coupled to support members located in another document storage container having an electrical input connector coupled to said electrical output connector.

7. An array of portable document storage containers for enabling remote location and retrieval of documents located in file folders received within said storage containers, each of said file folders having opposing ends. said array comprising:

a plurality of document storage containers each having a base wall; a plurality of upstanding wall members connected to said base wall, said base wall and said plurality of upstanding wall members defining an enclosure volume; first and second electrically conductive support members each secured to at least one of said wall members in an essentially parallel and mutually spaced manner, the mutually spaced manner between said first and second support members being sufficient to accommodate said ends of a file folder in mechanically supportive fashion; an electrical input connector secured to one of said upstanding wall members and ohmically coupled to said first and second support members for providing file folder address signals supplied by a source to at least one of said first and second support members, an electrical output connector secured to one of said upstanding wall members and ohmically coupled to said electrical input connector, the output connector of some of said document storage containers being coupled to the input connectors of other ones of said document storage containers to form an electrically intercoupled array so that said file folder address signals are coupled to any file folder supported by said support members in all of said storage containers in said intercoupled array; a storage container indicator; and an indicator control circuit for activating the storage container indicator in said storage container when a the file folder operationally installed on said first and second electrically conductive support members has an address matching said file folder address signals said indicator control circuit including a fixed resistance coupled between said electrical input connector and one of said first and second electrically conductive support members, means for sensing a voltage value at a junction of said fixed resistance and said one of said first and second electrically conductive support members, said sensing means having an input coupled to said junction and an output, and a control unit having an input coupled to the output of said sensing means and an output coupled to said storage container indicator for activating said storage container indicator when said voltage value reaches a threshold value; and a controller having an output coupled to the input connector of one of said plurality of document storage containers for providing file folder search signals supplied by a source to at least one of said first and second support members of the document storage container connected thereto, said file folder search signals being coupled to all of said document storage containers in said electrically intercoupled array so that said file folder search signals are coupled to any file folder supported by said support members in any of said document storage containers in said intercoupled array.

8. The invention of claim 7 wherein all of said plurality of document storage containers are electrically intercoupled.

9. The invention of claim 7 wherein said storage container indicator comprises a light source mounted to one of said wall members in a visible location.

10. The invention of claim 9 wherein said light source is an LED.

11. The invention of claim 7 wherein said sensing means comprises an operational amplifier.

12. The invention of claim 7 wherein said control unit comprises a microcontroller.

* * * * *

UNITED STATES PATENT AND TRADEMARK OFFICE
CERTIFICATE OF CORRECTION

PATENT NO. : 9,475,612 B2  
APPLICATION NO. : 14/121572  
DATED : October 25, 2016  
INVENTOR(S) : Zhu et al.

Page 1 of 1

It is certified that error appears in the above-identified patent and that said Letters Patent is hereby corrected as shown below:

on the title page, item (73) Assignee change "MICRODATA CORPORATION" to --iMicrodata Corporation--

Signed and Sealed this
Twentieth Day of December, 2016

Michelle K. Lee
*Director of the United States Patent and Trademark Office*